United States Patent
Stewart et al.

(10) Patent No.: US 9,824,475 B2
(45) Date of Patent: Nov. 21, 2017

(54) OBSCURING DISPLAYED INFORMATION

(71) Applicant: Lenovo (Singapore) Pte. Ltd., Singapore (SG)

(72) Inventors: Aaron Michael Stewart, Raleigh, NC (US); Howard J. Locker, Cary, NC (US); John Weldon Nicholson, Cary, NC (US); Michaela Rose Case, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 183 days.

(21) Appl. No.: 14/143,933

(22) Filed: Dec. 30, 2013

(65) Prior Publication Data

US 2015/0186673 A1    Jul. 2, 2015

(51) Int. Cl.
*G06T 11/60* (2006.01)
*G06F 21/55* (2013.01)

(52) U.S. Cl.
CPC .............. *G06T 11/60* (2013.01); *G06F 21/55* (2013.01); *G06F 2221/032* (2013.01)

(58) Field of Classification Search
None
See application file for complete search history.

(56) References Cited

U.S. PATENT DOCUMENTS

| | | | | |
|---|---|---|---|---|
| 2,034,386 A * | 3/1936 | Breckenridge | ......... | G09F 13/26 315/213 |
| 5,940,845 A * | 8/1999 | Prager | ............... | G06F 17/30569 704/8 |
| 6,577,330 B1 * | 6/2003 | Tsuda | .................. | G06F 3/04815 715/781 |
| 7,834,834 B2 * | 11/2010 | Takatani | ............... | G02F 1/1323 345/87 |
| 8,922,480 B1 * | 12/2014 | Freed | ....................... | G09G 5/00 345/156 |
| 2008/0155530 A1 * | 6/2008 | Prouvost | .......... | H04M 1/72552 717/174 |
| 2009/0313584 A1 * | 12/2009 | Kerr | ....................... | G06F 3/012 715/849 |
| 2011/0122130 A1 * | 5/2011 | Vesely | .................... | G06T 15/20 345/419 |
| 2011/0248987 A1 * | 10/2011 | Mitchell | ................. | G06T 15/20 345/419 |
| 2012/0200597 A1 * | 8/2012 | Yamada | .................. | G06F 21/31 345/629 |
| 2013/0215101 A1 * | 8/2013 | Duan | ....................... | G09G 5/32 345/419 |
| 2013/0321452 A1 * | 12/2013 | Kawalkar | ................ | G09G 3/20 345/629 |

(Continued)

OTHER PUBLICATIONS

Gee ("3D in Photoshop: The Ultimate Guide for Creative Professionals", by Zorana Gee, published Feb. 11, 2013, Zorana Press).*

*Primary Examiner* — William Beutel
(74) *Attorney, Agent, or Firm* — Brian J. Pangrle

(57) ABSTRACT

A method can include rendering pixel representations of information to a rectangular display; and rendering pixel representations of perspectival text to the rectangular display where the pixel representations of perspectival text overlay a portion of the pixel representations of information. Various other methods, apparatuses, systems, etc., are also disclosed.

18 Claims, 8 Drawing Sheets

(56) References Cited

U.S. PATENT DOCUMENTS

2014/0176562 A1* 6/2014 Somerfield ............. G06T 11/00
　　　　　　　　　　　　　　　　　　　　　　345/443
2015/0014980 A1* 1/2015 Joshi ...................... B42D 25/40
　　　　　　　　　　　　　　　　　　　　　　283/67

* cited by examiner

OBSCURING DISPLAYED INFORMATION

TECHNICAL FIELD

Subject matter disclosed herein generally relates to display of information.

BACKGROUND

People use display devices in various environments, including public environments such as cafes, busses, planes, trains, etc. In such environments, information rendered to a display device may be viewed by another. For any of a variety of reasons, a person may not want another person to see or understand what is being rendered to her display device.

SUMMARY

A method can include rendering pixel representations of information to a rectangular display; and rendering pixel representations of perspectival text to the rectangular display where the pixel representations of perspectival text overlay a portion of the pixel representations of information. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

A user may desire some amount of privacy as to what is being displayed on his display device. As an example, a display device may be provided with circuitry to render obscuring information, for example, to deter, confound, etc. one or more off-angle, unauthorized viewers. As an example, a user may be viewing information such as text (e.g., an email, SMS, social media, etc.) displayed to a display of a device where circuitry may select text for warping, stretching, etc., for example, to overlay and obscure (e.g., scramble) visual characteristics as to one or more others that may be outside of the user's perspective with respect to the display. As an example, a device may determine or assume (e.g., via a default setting) a user's position and may, for example, visually manipulate obscuring content based on the user's view (e.g., to deter others).

As an example, a device may include circuitry that implements an optical illusion, for example, akin to a puzzle that hides words, phrases, etc. For example, consider a puzzle that includes words that are stretched and overlain such that by tilting of the puzzle to a specific angle or angles (e.g., orientations), one or more words, phrases, etc. may become discernable to the viewer. As an example, a device may include circuitry to generate obscuring information that obscures a user's information and that provides a "puzzle" to others. In such an example, a specific message may be presented for unwanted on-lookers. For example, a device owner could see their email while on-lookers see the message "Private".

As an example, a user may compose text using a device and select an option to "scramble" the view. The device may then manipulate the text into a scrambled message like that of an optical illusion word find puzzle. In such a manner, when another person receives the text (e.g., via a display device), the text may be portrayed with such manipulations to make the text private to that person. For example, a device may receive a scrambled message and render the scrambled message to a display operatively coupled to the device. In such an example, a user of the device may know (e.g., a priori, via a separate message, etc.) how to view the scrambled message to reveal an intended message obscured therein.

Figure 1:
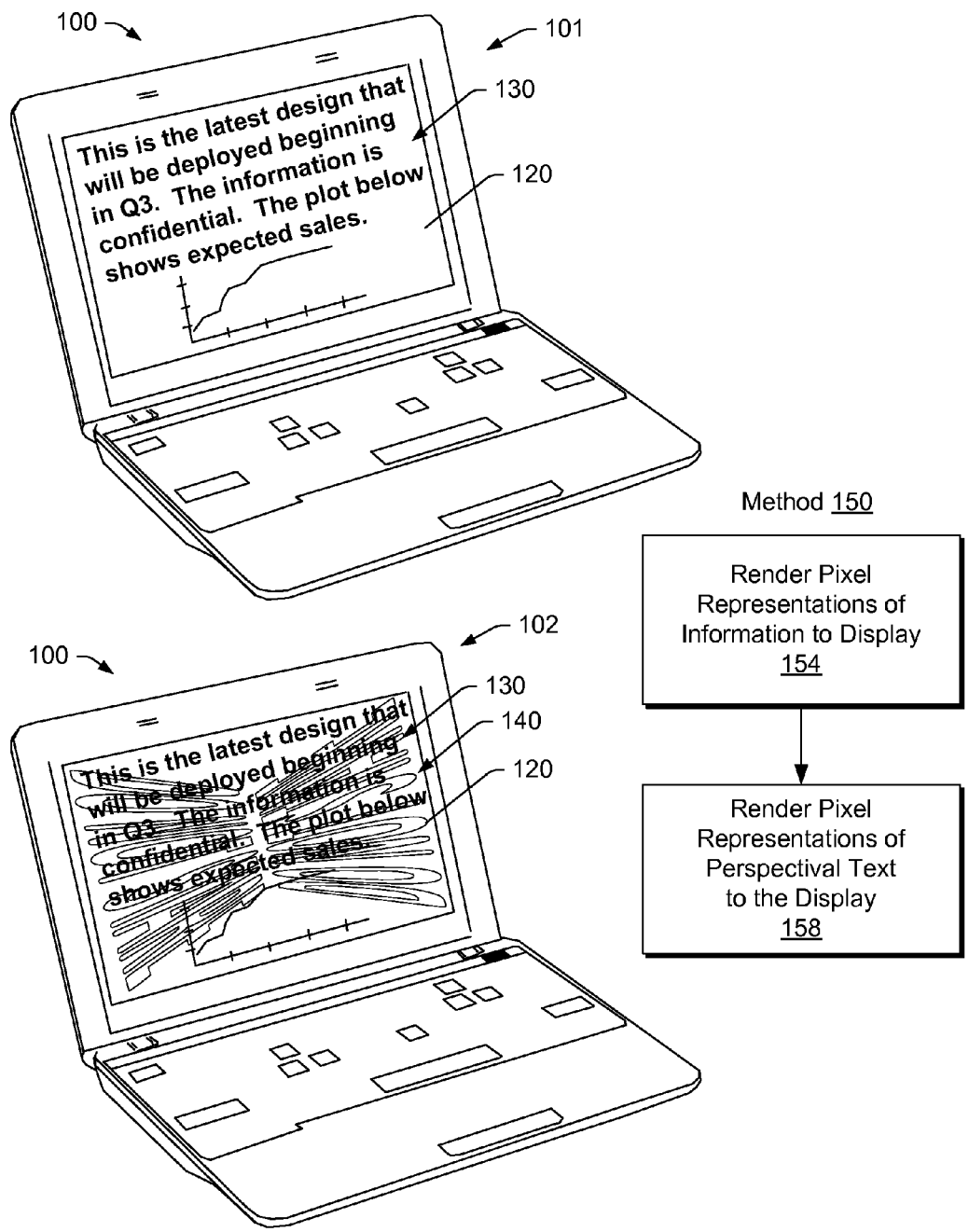
FIG. 1 is a diagram of an example of a system and an example of a method.

FIG. 1 shows an example of a system 100, in a first state 101 and in a second state 102, and an example of a method 150. As shown, the system 100 includes a display 120 where the system 100 can render pixel representations of information 130 to the display 120. As an example, the system 100 may include one or more processors (e.g., one or more of a CPU, GPU, or other type of processor). As an example, the system 100 may include a processor that may access information and/or instructions (e.g., stored in memory, accessed via a network, etc.) and render pixel representations of information to the display 120. As an example, pixel representations of information may be graphics, photos, text, etc.

In the example of FIG. 1, in the state 101, the system 100 is shown as rendering pixel representations of information 130 to the display 120 where the pixel representations of information 130 include text and graphics. In the state 102, the system 100 is shown as rendering the pixel representations of information 130 to the display 120 and rendering pixel representations of obscuring information 140 to the display 120. As an example, the obscuring information may be text. As an example, pixel representations of obscuring information may be rendered according to one or more perspectives. As an example, where obscuring information is text, it may be referred to as perspectival text where it is rendered with respect to a perspective or point of view, a vanishing point, etc.

As shown in the example of FIG. 1, the pixel representations of obscuring information 140 may be pixel representations of perspectival text ("Do Not Stare") presented with respect to multiple perspectives. Such representations may obscure the pixel representations of information 130, particularly for off-angle viewers (e.g., a viewer that views the display 120 from a perspective that is not along a vector normal to the display). As an example, perspectival text, as rendered to a display, may act to scramble other information, as rendered to the display, with respect to one or more unauthorized viewers.

As shown in the example of FIG. 1, the method 150 includes a render block 154 for rendering pixel representations of information to a rectangular display and a render block 158 for rendering pixel representations of perspectival text to the rectangular display where the pixel representations of perspectival text overlay a portion of the pixel representations of information.

As an example, a method may include rendering pixel representations of information to a display with respect to a perspective or point of view along a normal to the display and rendering pixel representations of obscuring information to the display, for example, with respect to one or more perspectives or points of view that are not along the normal to the display (e.g., off-angle perspectives or points of view).

Figure 2:
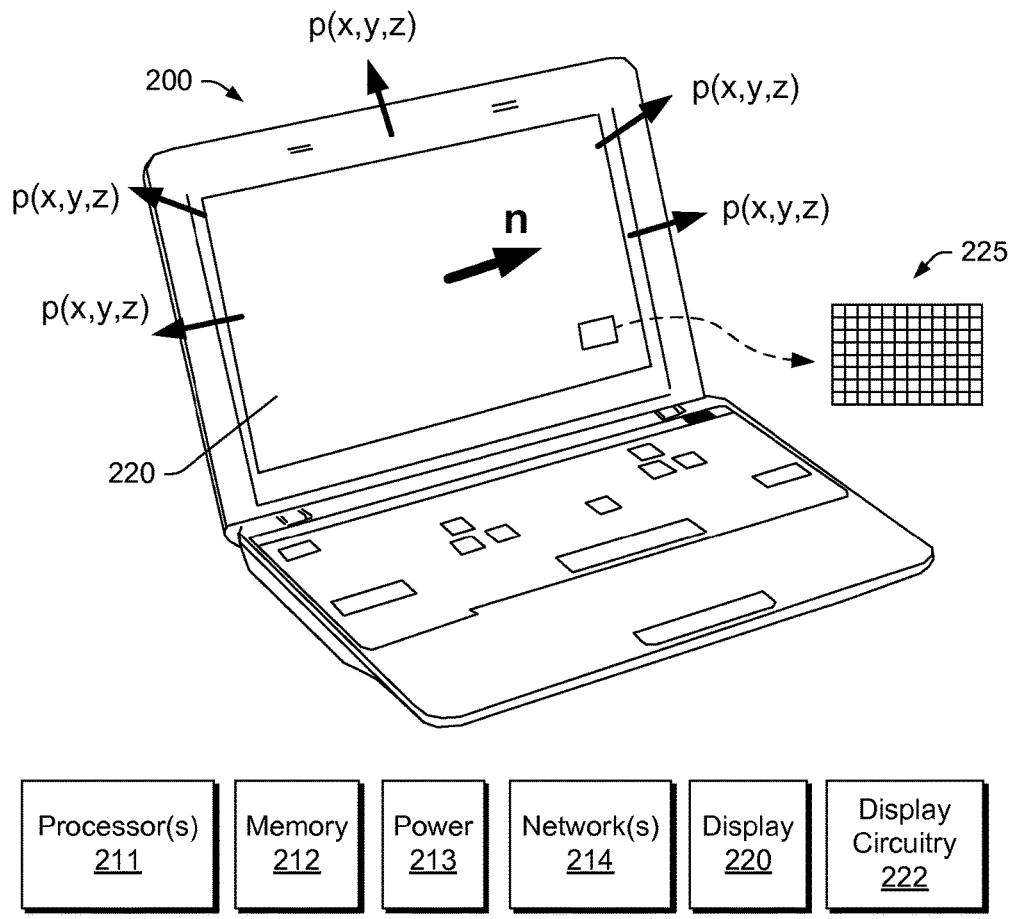
FIG. 2 is a diagram of an example of a system and examples of methods.
Figure 2:
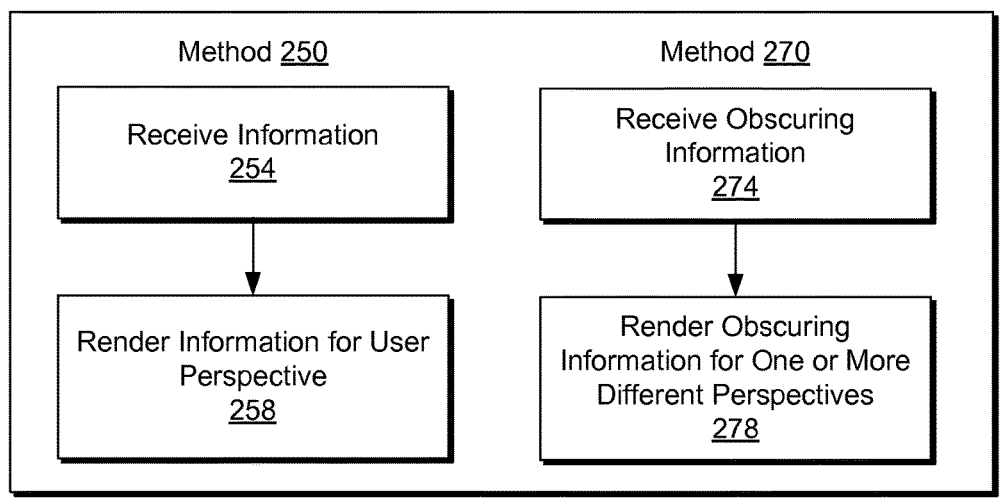

FIG. 2 shows an example of a system 200 that can include one or more processors 211, memory 212, a power supply 213, a network interface 214, a display 220 and display circuitry 222. As an example, the display 220 may be defined according to one or more resolutions (e.g., including a native resolution). As an example, the display circuitry 222 may represent information as pixels 225 (e.g., picture elements), for example, with pixel values, that may be rendered to the display 220. As an example, the display circuitry 222 may include a display buffer, for example, memory that may be dedicated to display tasks. As an example, display circuitry 222 may include circuitry for graphics, circuitry for images, circuitry for video, etc. As an example, display circuitry 222 may include circuitry for vector graphics (e.g., for interpretation of instructions to render graphics). As an example, display circuitry 222 may include depth buffering circuitry (e.g., for z-buffering, w-buffering, etc.). As an example, display circuitry 222 may include effects circuitry, for example, to stream information, to "blink" information (e.g., change intensity with respect to time), to colorize information, to adjust transparency of information, etc.

FIG. 2 also shows an example of a method 250 and an example of a method 270. As shown, the method 250 may include a reception block 254 for receiving information and a render block 258 for rendering information for a user perspective. As shown, the method 270 may include a reception block 274 for receiving obscuring information and a render block 278 for rendering the obscuring information for one or more different perspectives, for example, which may differ from the user perspective of the method 250. As an example, the methods 250 and 270 may be implemented together. As an example, the system 200 may be configured to implement the method 250 and, for example, to implement the method 270 based on one or more commands, conditions, triggers, etc. As an example, the system 200 may include a user interface that provides for user input to enable and disable a method such as the method 270. As an example, a user interface may be a graphical user interface (e.g., for input via touch, a stylus, a mouse, a track pad, etc.), a voice command user interface (e.g., for input via a microphone), or other type of user interface.

In the example of FIG. 2, the system 200 is shown along with various vectors, including a vector "n" normal to the display 220. The various perspective vectors, "p", may be associated with a coordinate system that may reference the display 220. For example, the display 220 may define a coordinate system (e.g., a Cartesian or other coordinate system) for purposes of rendering pixel representations of perspectival information such as, for example, perspectival text.

Figure 3:
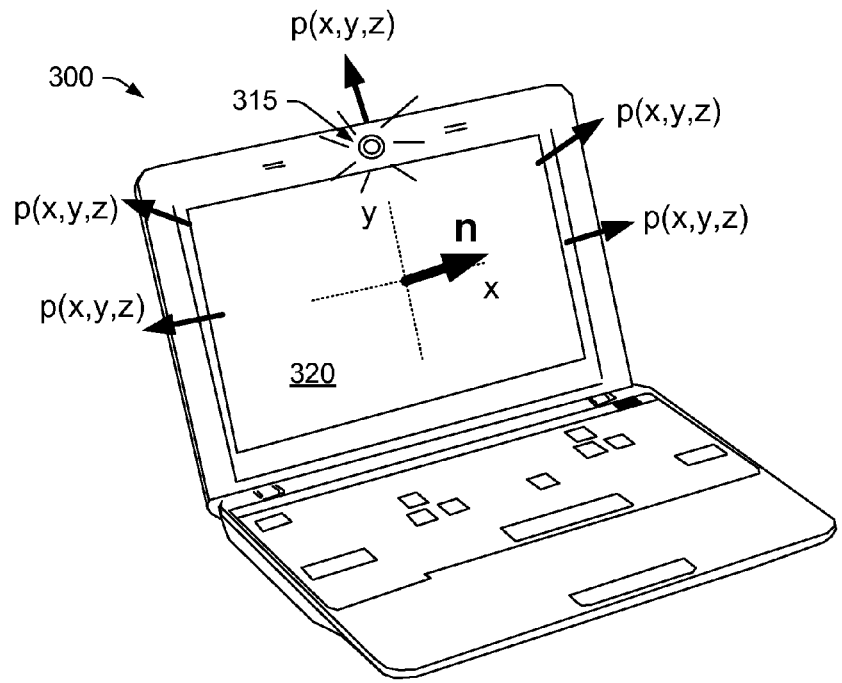
FIG. 3 is a diagram of an example of a system and an example of a method.
Figure 3:
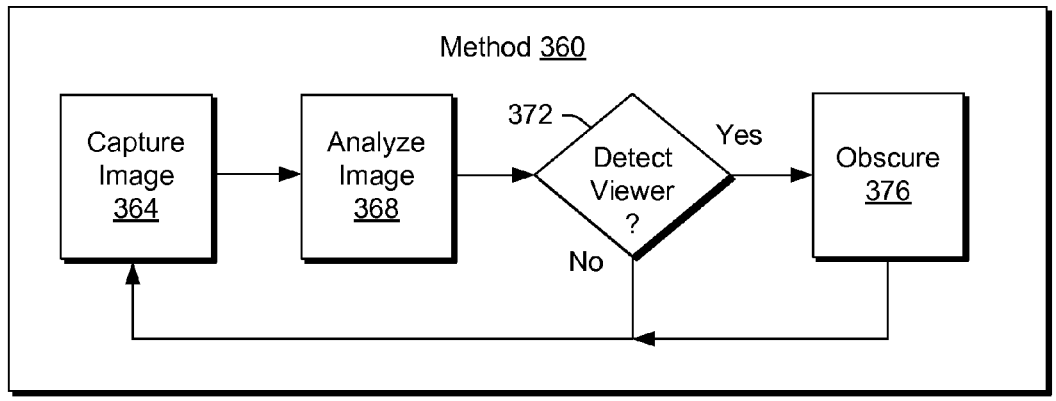
Figure 3:
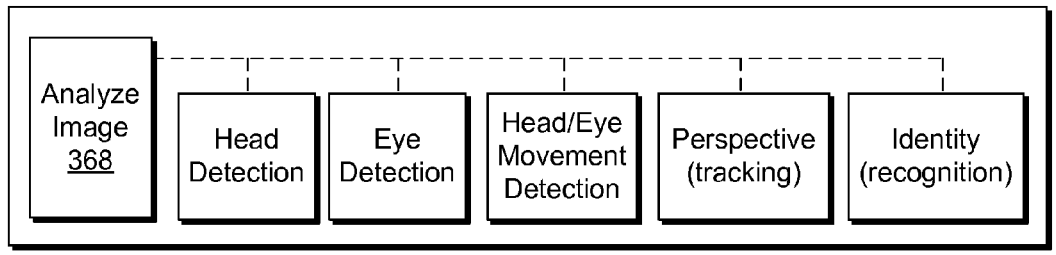

FIG. 3 shows an example of a system 300 that includes a sensor 315 and a display 320. As an example, the sensor 315 may be a camera that has a field of view that can detect objects, which may be people that can view the display 320. As an example, an object may be camera (e.g., a video surveillance camera). As an example, the sensor 315 may be an object detection sensor, for example, with a range that extends a distance from the display 320. In such an example, a maximum distance of the range may correspond to what a person with 20/20 vision may be able to read for text of a given text size rendered to the display 320. As an example, a system may include circuitry to discern a user from one or more others, for example, based at least in part on input from one or more sensors.

As an example, FIG. 3 shows a method 360 that includes a capture block 364 for capturing an image (e.g., or images), an analysis block 368 for analyzing a captured image (e.g., or images), a decision block 372 for deciding whether a viewer has been detected in a captured image per an analysis of the captured image and an obscure block 376 for obscuring pixel representations of information rendered to a display, for example, where the decision block 372 decides that a viewer has been detected (e.g., where a viewer is not a user, not an authorized viewer, etc.). As an example, detection of a person that is not positioned substantially along a normal vector to a display may be considered a viewer and, for example, by default, a non-authorized viewer (e.g., an unauthorized viewer). As an example, a method may account for an authorized viewer, for example, a person positioned directly next to a user. As an example, a method may include a field (e.g., a cone, etc.) that is considered an authorized field, for example, for a user and optionally one or more authorized viewers.

As an example, a size of an authorized field may be defined by one or more parameters such as, for example, an angle of view, a distance from a display, etc. As an example, a system may include decision logic that can decide whether an unauthorized viewer is in a field of view, for example, based on one or more parameters (e.g., including one or more criteria that may be based on combinations of parameters). As an example, a method may include receiving a command to adjust a size of an authorized field, a direction of an authorized field, etc. For example, a user may adjust an authorized field to permit a viewer situated to the right of the user, to left of the user, above the user, etc. As an example, in response to a decision, a command, etc., a system may implement a method that acts to obscure information rendered to a display.

In the example of FIG. 3, the analysis block 368 may optionally provide for one or more of head detection, eye detection, head and/or eye movement detection, perspective detection (e.g., including perspective tracking), identity detection (e.g., identity recognition), etc. As an example, where an object is detected, an algorithm may determine whether the object is a head, whether the object has eyes, whether the object is stationary, whether the object is or includes a lens, etc. As an example, where a viewer has been detected, a method may include tracking the viewer, for example, to determine the viewer's perspective with respect to a display. As an example, a method may include tracking a viewer and adjusting a perspective for pixel representations of obscuring information such as perspectival text (e.g., to confound viewing of pixel representations of certain information by that viewer).

As an example, a system may include face detection circuitry. For example, a sensor may capture an image and face detection circuitry may analyze the image (e.g., image data) to determine whether it includes a face and, for example, optionally what direction a face is facing. For example, a direction of a face may be determined using one or more criteria such as a mouth criterion, a nose criterion, an eye criterion, a spectacles criterion, etc.

As an example, face detection circuitry may be configured to determine an identity of a detected face. For example, a system may analyze an image of a face of a user to derive one or more metrics (e.g., width, height, distance between eyes, length of nose, shape of eyebrows, ratios, etc.). In such an example, a system may be configured with a sensor to capture an image and to analyze the image (e.g., image data) using face detection circuitry to determine whether a match exists between a detected face and one or more face related metrics (e.g., which may be stored in memory of the system). Such a system may then decide whether a detected face is that of a user, which may be assumed to be an authorized viewer.

As an example, a system may be configured to adjust a perspective based in part on a point of view of an object that has been determined to be an authorized viewer (e.g., a user of the system). In such an example, tracking may be performed to track the object (e.g., the object having been associated with an identified face) and, in turn, information may be rendered to a display of the system according to a viewing perspective of the object. In such a manner, the system may provide an authorized viewer (e.g., a user of the system) with an optimal view given the point of view of the authorized viewer with respect to the display of the system. As an example, where an authorized viewer is located at a position that is not normal to a plane of a display, information rendered to the display may be rendered in a perspectival manner, for example, based at least in part on the location of the authorized viewer with respect to the display. Where such information includes text, the system may render perspective text to the display for viewing by the authorized viewer.

Figure 4:
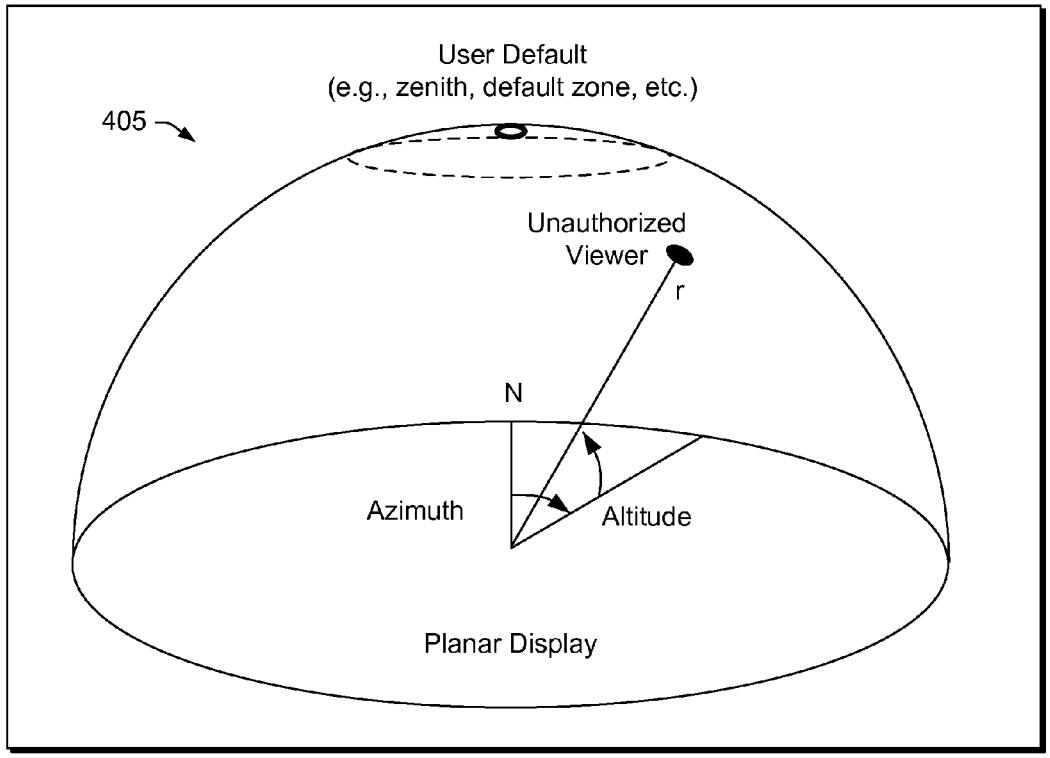
FIG. 4 is a diagram of an example of a coordinate system and an example of a method.
Figure 4:
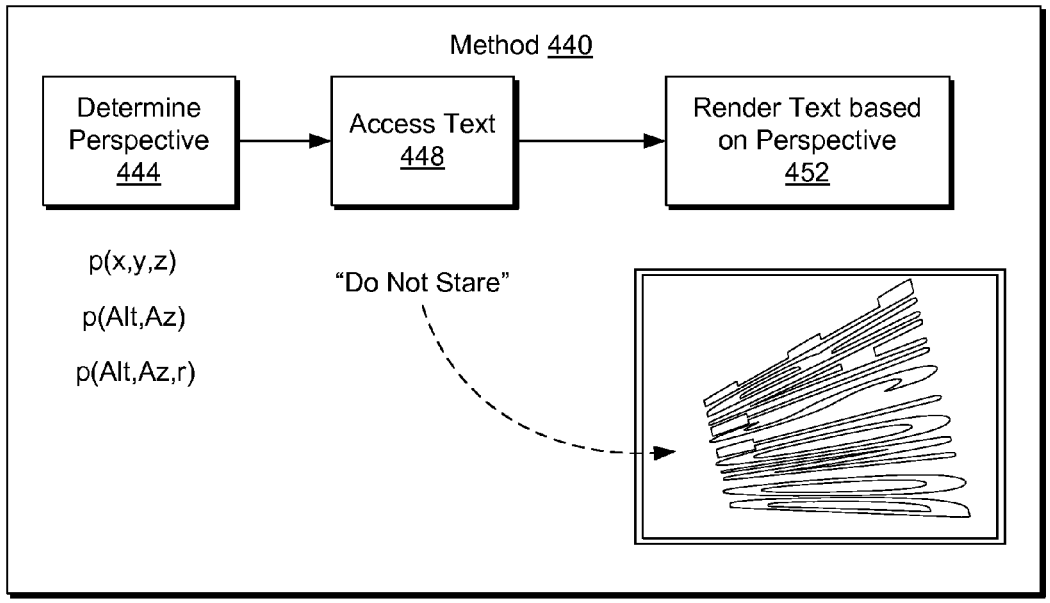

FIG. 4 shows an example of a coordinate system 405 and an example of a method 440. As shown, the coordinate system 405 includes an azimuth angle and an altitude angle that may define a position of an unauthorized viewer. As an example, a user, as an authorized viewer, may be considered to be at or approximately at a zenith. As an example, a direction may be specified, for example, consider "N" (e.g., north). As an example, the coordinate system 405 may be defined for a display (e.g., a planar display).

As an example, a zone may be specified as a user zone, for example, a zone that may be about a zenith (e.g., specified by one or more angles, etc.) in which a detected viewer may be considered to be an authorized viewer. As an example, a user zone may be specified with respect to a depth, for example, a distance away from a display (e.g., a user zone may end at a particular distance from a display). As an example, a user may optionally define a zone or zones. As an example, circuitry may optionally determine a zone or zones, for example, based on tracking of a viewer or viewers. As an example, a viewer that is determined to be unauthorized may be tracked such that a notification may be issued, for example, if that viewer enters within a zone associated with an authorized viewer a warning may be issued. As an example, if a viewer is detected outside of a zone specified for an authorized viewer (e.g., or viewers) of a display and that detected viewer moves with respect to the display, for example, to gain a better view of information rendered to the display, circuitry may issue a notification, for example, to warn an authorized viewer. In such an example, a graphical control (e.g., a graphical user interface, etc.) may be rendered to the display, which may be a touch display, such that an authorized viewer (e.g., a user) may optionally touch the display (e.g., the graphical control), for example, to dim the display, change the information rendered to the display (e.g., to a wallpaper image, etc.), turn off the display, etc.

As shown in FIG. 4, the method 440 can include a determination block 444 for determining a perspective, an access block 448 for accessing text and a render block 452 for rendering the text based at least in part on a determined perspective. For example, the determination block 444 may determine a perspective using a coordinate system or coordinate systems; the access block 448 may access text from a lexicon, a database, etc.; and the render block 452 may render pixel representations of the text, as perspectival text, according to the perspective of the determination block 444. As to determining a perspective, as an example, one or more sensors may be implemented that may detect an object and, for example, determine whether that object is a "viewer" (e.g., based on one or more criteria). Further, a method may include determining whether a viewer is an unauthorized viewer (e.g., based on one or more criteria).

Figure 5:
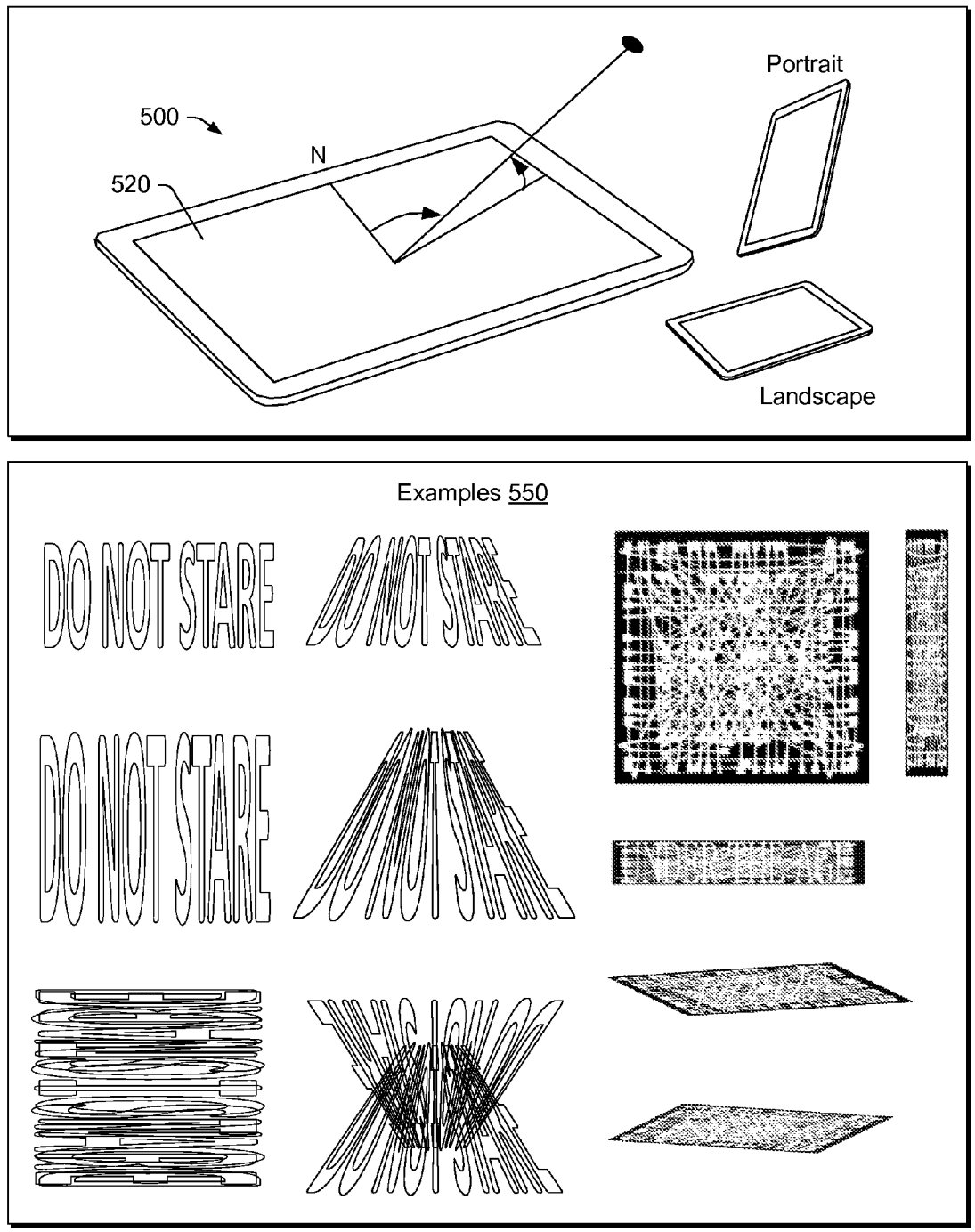
FIG. 5 is a diagram of an example of a system and examples of perspectival text.

FIG. 5 shows an example of a system 500 that includes a display 520 and examples of perspectival text 550. As an example, the system 500 may be an information handling system, for example, consider a tablet. As an example, the system 500 may be oriented in a particular orientation and, for example, information rendered to the display 520 may be reoriented, for example, from a portrait orientation to a landscape orientation and vice versa. As an example, pixel representations of perspectival text may retain an orientation, for example, be represented, responsive to a change in orientation of a system (e.g., reorientation of the display 520 of the system 500).

As shown in FIG. 5, the examples 550 include some variations, which may include multiple perspectives, vanishing point perspectives, stretched perspectives, etc. While some examples use the text "Do Not Stare", other text may be used and/or graphics may be used, for example, where such graphics may optionally convey information (e.g., known shapes, etc.). As to a more complex one of the examples 550, various words and phrases including "OVER THE EDGE", "UNDER THE AGE", "VIDEOS" and GENIUS" may be discerned for particular perspectives.

As an example, text, graphics, etc. may convey information to an off-angle, unauthorized viewer, which may psychologically distract the unauthorized viewer from viewing other information rendered to a display. As an example, obscuring information may, in part, physically obscure and well as, in part, psychologically obscure (e.g., subliminally or otherwise).

Figure 6:
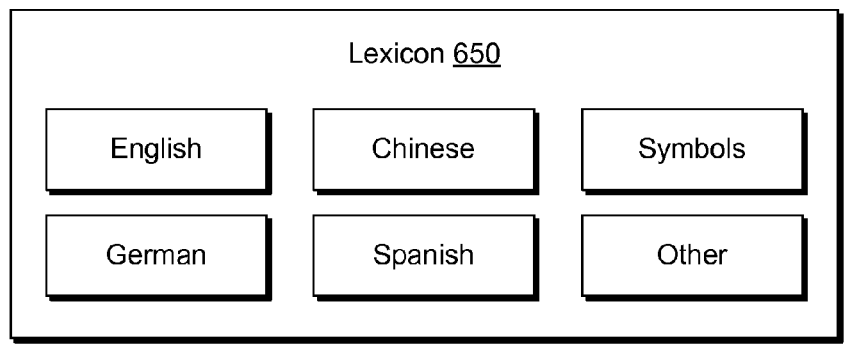
FIG. 6 is a diagram of an example of a lexicon, an example of circuitry and an example of a method.
Figure 6:
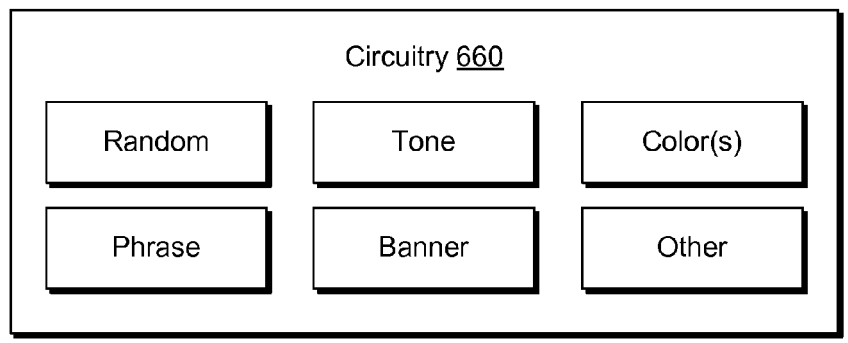
Figure 6:
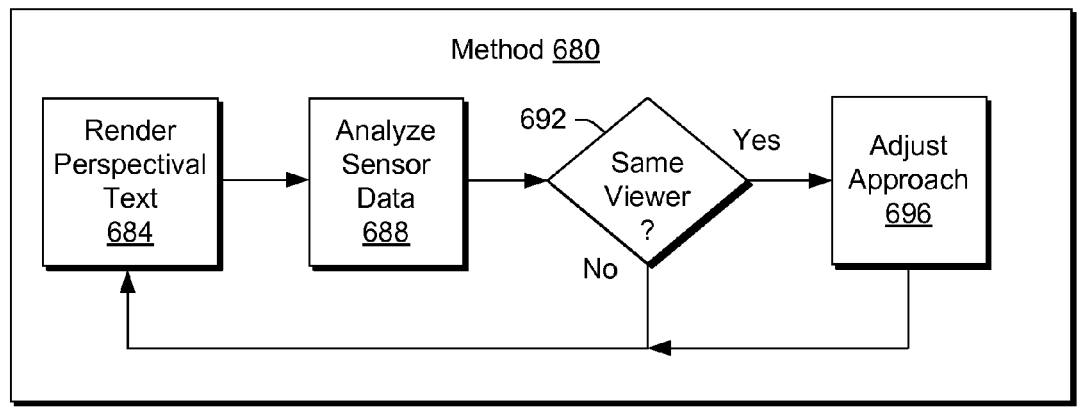

FIG. 6 shows an example a lexicon 650, an example of circuitry 660 and an example of a method 680. As an example, a lexicon may include words in one or more languages, symbols, etc. As an example, circuitry may interoperate with a lexicon. As shown in FIG. 6, the circuitry 660 may include circuitry to randomly select words, phrases, etc. from the lexicon 650, to select words or phrases with a particular tone (e.g., demeanor, message, etc.), to present words or phrases as a running banner, to present words or phrases with one or more colors, etc.

In the example of FIG. 6, the method 680 includes a render block 684 for rendering perspectival text to a display, an analysis block 688 for analyzing sensor data (e.g., proximity sensor data, camera sensor data, etc.), a decision block 692 for deciding whether an unauthorized viewer is persistently present and an adjustment block 696 for adjusting an approach to the rendering of the perspectival text (e.g., pixel representations of the perspectival text) to the display in an effort to more effectively deter the unauthorized viewer. For example, an adjustment may be an adjustment in tone (e.g., "Stop Staring", "What Are YOU Looking At?", "Give Me A Break!", etc.), an adjustment in color (e.g., to red, etc.), an adjustment to flashing (e.g., blinking), etc.

Figure 7:
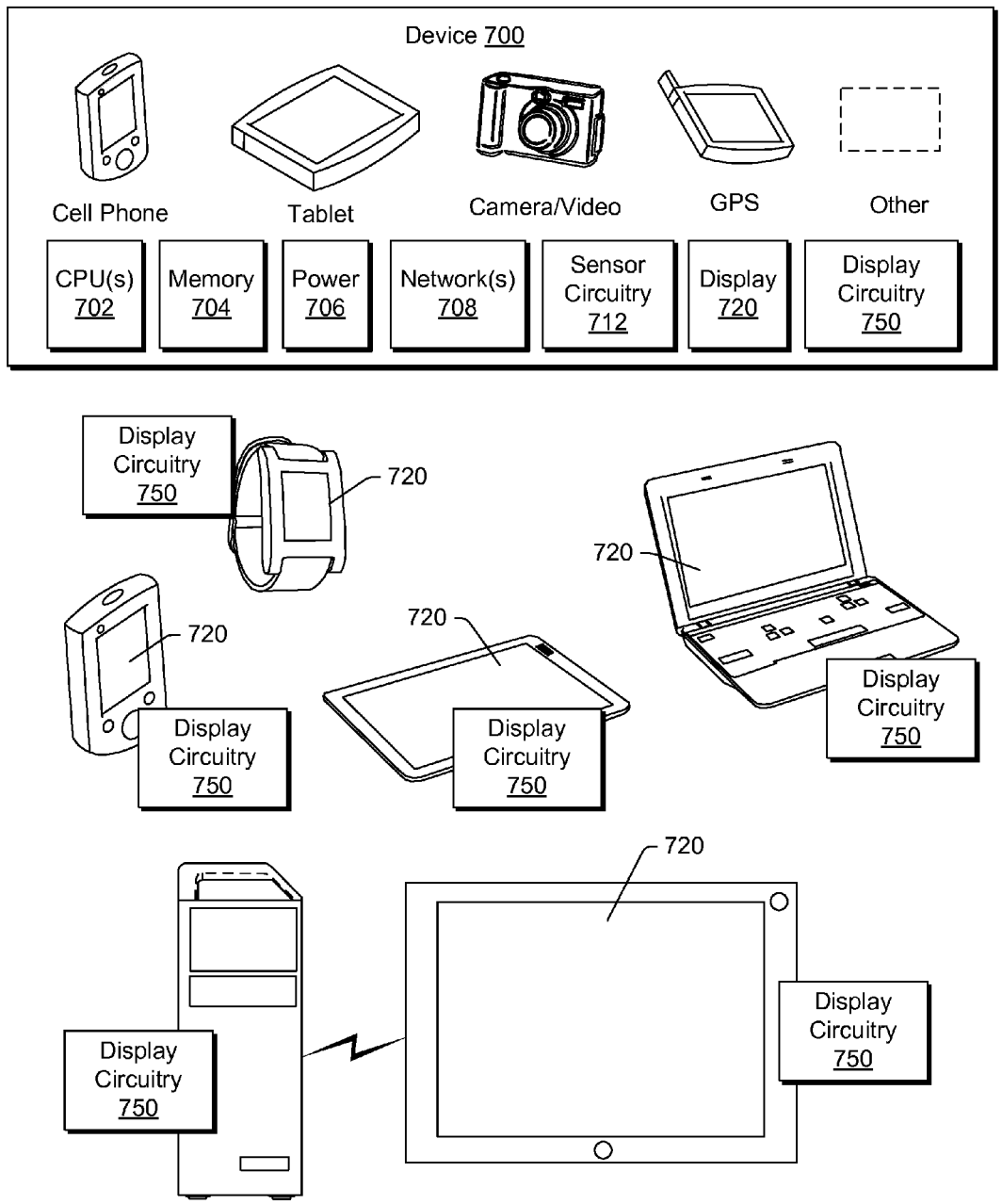
FIG. 7 is a diagram of examples of devices.

FIG. 7 shows an example of a device 700 that includes a display 720 and display circuitry 750. As shown, the device 700 may be configured as a watch, a phone, a tablet, a notebook, a desktop system, a camera, a GPS device or other device. As an example, the device 700 may include one or more processors 702, memory 704, a power source 706, one or more network interfaces 708, sensor circuitry 712, a display 720 (e.g., or displays), and display circuitry 750. As an example, a device may include display circuitry. As an example, display circuitry may be operatively coupled to a processor, may include a processor, etc. As an example, a system may include display circuitry and a panel display and/or a projector that projects light to a viewing panel.

As an example, a device may include circuitry to "scramble" a view. For example, a user may compose text and then select a scramble option. The user may then send the composed text along with scramble information, for example, that causes presentation of the text, once received, to be scrambled according to the scramble information. As an example, the receiver of the scrambled message may recover the composed text by viewing the scrambled presentation at a particular angle (e.g., perspective), which may be known a priori (e.g., according to a code or other information, which may be communicated separately).

As an example, a method can include rendering pixel representations of information to a rectangular display; and rendering pixel representations of perspectival text to the rectangular display where the pixel representations of perspectival text overlay a portion of the pixel representations of information. In such a method, the pixel representations of perspectival text may include at least one perspective associated with a point of view displaced from a vector normal to the rectangular display. As an example, pixel representations of information may include a perspective associated with a point of view substantially along a vector normal to the rectangular display.

As an example, a method can include detecting an object in a field of view of a rectangular display, determining a point of view for the object and rendering pixel representations of perspectival text to the rectangular display based at least in part on the point of view of the object.

As an example, a method may include periodically rendering pixel representations of different perspectival text to a rectangular display. As an example, a method may include generating perspectival text using a database. As an example, a method may include randomly selecting perspectival text. As an example, perspectival text may include at least one color. As an example, text may include a color and perspectival text may include a different color. For example, pixel representations of information, which may include text, may include a color and pixel representations of perspectival text may include a different color.

As an example, a system can include a processor; memory operatively coupled to the processor; a rectangular display operatively coupled to the processor; display circuitry that receives information from the processor and that renders pixel representations of the information to the rectangular display and that renders pixel representations of perspectival text to the rectangular display where the pixel representations of the perspectival text overlay at least a portion of the pixel representations of the information.

As an example, a system may include circuitry that randomly selects perspectival text. As an example, a system may include a sensor that senses objects in a field of view of a rectangular display and selection circuitry that selects a perspective for pixel representations of perspectival text based at least in part on a sensed object in the field of view of the rectangular display. In such an example, the selection circuitry may select multiple perspectives for pixel representations of perspectival text based at least in part on sensed objects in the field of view of the rectangular display.

As an example, a system may render pixel representations of perspectival text for at least one perspective associated with a point of view displaced from a vector normal to the rectangular display. As an example, a system may render pixel representations of information for a perspective associated with a point of view along a vector normal to a rectangular display.

As an example, one or more computer-readable storage media may include processor-executable instructions to instruct an information handling system to: render pixel representations of information to a rectangular display; and render pixel representations of perspectival text to the rectangular display where the pixel representations of perspectival text overlay a portion of the pixel representations of information. In such an example, the pixel representations of perspectival text may be for at least one perspective associated with a point of view displaced from a vector normal to the rectangular display. As an example, pixel representations of information may be for a perspective associated with a point of view along a vector normal to a rectangular display.

As an example, one or more computer-readable storage media may include instructions to instruct an information handling system to sense objects in a field of view of a rectangular display and to select a perspective for pixel representations of perspectival text based at least in part on a sensed object in the field of view of the rectangular display.

As an example, one or more computer-readable storage media may include instructions to instruct an information handling system to periodically render pixel representations of different perspectival text to a rectangular display where the pixel representations of different perspectival text overlay a portion of pixel representations of information (e.g., for a viewing perspective along a vector substantially normal to the rectangular display).

As described herein, various acts, steps, etc., may be implemented as instructions stored in one or more computer-readable storage media. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 8:
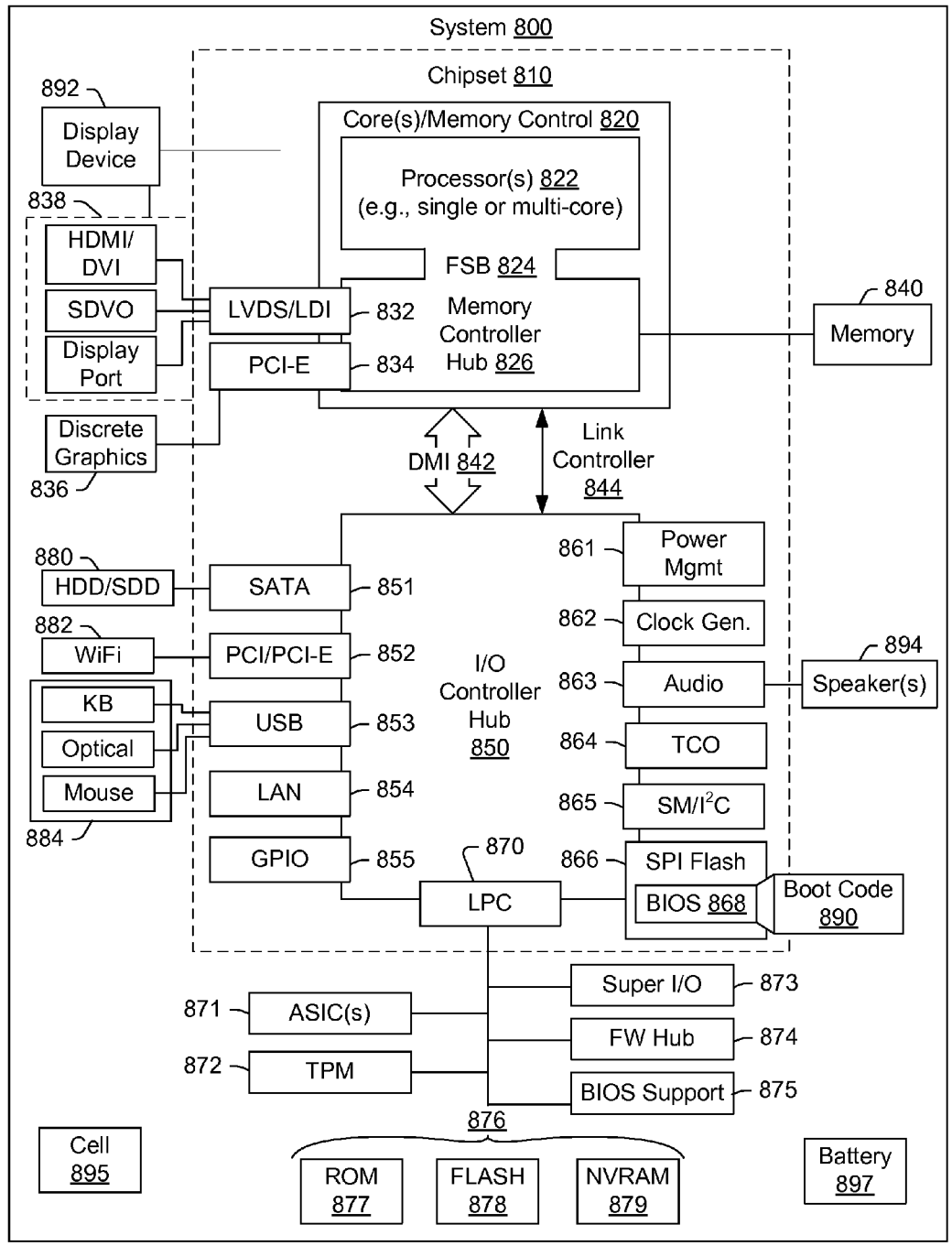
FIG. 8 is a diagram of an example of a system.

While various examples of circuits or circuitry have been discussed, FIG. 8 depicts a block diagram of an illustrative computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As an example, a device such as one of the devices of FIG. 7 may include at least some of the features of the system 800.

As shown in FIG. 8, the system 800 includes a so-called chipset 810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., $I^2C$, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800. Also shown in FIG. 8 is battery circuitry 897, which may provide one or more battery, power, etc., associated features (e.g., optionally to instruct one or more other components of the system 800). As an example, a SMBus may be operable via a LPC (see, e.g., the LPC interface 870), via an $I^2C$ interface (see, e.g., the SM/$I^2C$ interface 865), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising:
rendering pixel representations of information to a rectangular display via display circuitry of the computing device to generate a user view of the pixel representations of the information in an orientation selected from a portrait orientation and a landscape orientation of the rectangular display;
detecting an object outside an authorized viewing field by detection circuitry of the computing device wherein the detecting comprises determining a point of view for the object as an unauthorized viewer point of view; and
responsive to the detecting, generating obscuring text using a database accessible by the computing device and rendering pixel representations of the obscuring text to the rectangular display via the display circuitry based at least in part on the point of view of the object in at least one orientation that differs from the orientation of the user view wherein the pixel representations of the obscuring text overlay and obscure a portion of the pixel representations of the information as rendered to the rectangular display.

2. The method of claim 1 further comprising periodically rendering pixel representations of different obscuring text to the rectangular display.

3. The method of claim 1 wherein generating comprises randomly selecting the obscuring text.

4. The method of claim 1 wherein the obscuring text comprises at least one color.

5. The method of claim 1 wherein the pixel representations of information comprise a color and wherein the pixel representations of the obscuring text comprise a different color.

6. The method of claim 1 wherein the pixel representations of the obscuring text comprise a phrase.

7. The method of claim 6 wherein the phrase is selected from the database according to a particular tone that conveys information to psychologically deter an unauthorized viewer.

8. A system comprising:
a processor;
memory operatively coupled to the processor;
detection circuitry that detects an object outside an authorized viewing field at least in part by determination of a point of view for the object as an unauthorized viewer point of view;
a rectangular display operatively coupled to the processor;
display circuitry that receives information from the processor and that renders pixel representations of the information to the rectangular display to generate a user view of the pixel representations of the information in an orientation selected from a portrait orientation and a landscape orientation of the rectangular display, and that, responsive to detection by the detection circuitry of an object outside the authorized viewing field, generates obscuring text using a database and renders pixel representations of the obscuring text to the rectangular display based at least in part on the point of view of the object in at least one orientation that differs from the orientation of the user view wherein the pixel representations of the obscuring text overlay and obscure at least a portion of the pixel representations of the information as rendered to the rectangular display.

9. The system of claim 8 wherein the display circuitry comprises circuitry that generates the obscuring text by random selection of the obscuring text from the database.

10. The system of claim 8 wherein the detection circuitry comprises a sensor that senses one or more objects outside the authorized viewing field and selection circuitry that selects at least one of the at least one orientation for the pixel representations of the obscuring text based at least in part on a position of a sensed object outside the authorized viewing field.

11. The system of claim 10 wherein the selection circuitry selects multiple orientations for pixel representations of the obscuring text based at least in part on sensed objects in the field of view of the rectangular display.

12. The system of claim 8 wherein the pixel representations of the obscuring text comprise a phrase.

13. The system of claim 12 wherein the phrase is selected from the database according to a particular tone that conveys information to psychologically deter an unauthorized viewer.

14. One or more non-transitory computer-readable storage media comprising processor-executable instructions to instruct an information handling system to:
render pixel representations of information to a rectangular display to generate a user view of the pixel representations of the information in an orientation selected from a portrait orientation and a landscape orientation of the rectangular display;
detect an object outside an authorized viewing field at least in part by determination of a point of view for the object as an unauthorized viewer point of view; and
responsive to detection of the objection, generate obscuring text using a database and render pixel representations of the obscuring text to the rectangular display based at least in part on the point of view of the object in at least one orientation that differs from the orientation of the user view wherein the pixel representations of obscuring text overlay and obscure a portion of the pixel representations of the information as rendered to the rectangular display.

15. The one or more non-transitory computer-readable storage media of claim 14 comprising instructions to instruct an information handling system to select at least one of the at least one orientation for the pixel representations of the obscuring text based at least in part on a position of the object.

16. The one or more non-transitory computer-readable storage media of claim 14 comprising instructions to instruct an information handling system to periodically render pixel representations of different obscuring text to the rectangular display wherein the pixel representations of the different obscuring text overlay a portion of the pixel representations of the information.

17. The one or more non-transitory computer-readable storage media of claim 14 wherein the pixel representations of the obscuring text comprise a phrase.

18. The one or more non-transitory computer-readable storage media of claim 17 wherein the phrase is selected from the database according to a particular tone that conveys information to psychologically deter an unauthorized viewer.

* * * * *